United States Patent
Tossens et al.

(10) Patent No.: US 10,869,478 B2
(45) Date of Patent: *Dec. 22, 2020

(54) USES OF 2-(2,4-DICHLOROPHENYL) METHYL-4,4-DIMETHYL-3-ISOXAZOLIDONE AS FOLIAR HERBICIDE

(71) Applicant: Bayer CropScience Aktiengesellschaft, Monheim am Rhein (DE)

(72) Inventors: Herve Tossens, Verlaine (BE); Julio Perez Catalan, Monheim am Rhein (DE); Thomas Auler, Bergisch Gladbach (DE); Hubert Menne, Mainz-Kastel (DE)

(73) Assignee: BAYER CROPSCIENCE AKTIENGESELLSCHAFT, Monheim am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,949

(22) Filed: Nov. 22, 2019

(65) Prior Publication Data

US 2020/0085055 A1    Mar. 19, 2020

Related U.S. Application Data

(62) Division of application No. 15/750,221, filed as application No. PCT/EP2016/068598 on Aug. 4, 2016, now Pat. No. 10,609,928.

(30) Foreign Application Priority Data

Aug. 7, 2015  (EP) .................... 15180105

(51) Int. Cl.
| | | |
|---|---|---|
| *A01N 43/80* | (2006.01) | |
| *A01N 43/40* | (2006.01) | |
| *A01N 43/82* | (2006.01) | |
| *A01N 43/56* | (2006.01) | |
| *A01N 43/653* | (2006.01) | |
| *A01N 43/76* | (2006.01) | |
| *A01N 25/32* | (2006.01) | |
| *A01N 33/22* | (2006.01) | |
| *A01N 37/34* | (2006.01) | |
| *A01N 47/30* | (2006.01) | |

(52) U.S. Cl.
CPC ............. *A01N 43/80* (2013.01); *A01N 25/32* (2013.01); *A01N 33/22* (2013.01); *A01N 43/40* (2013.01); *A01N 43/82* (2013.01); *A01N 37/34* (2013.01); *A01N 43/56* (2013.01); *A01N 43/653* (2013.01); *A01N 43/76* (2013.01); *A01N 47/30* (2013.01); *A01N 2300/00* (2013.01)

(58) Field of Classification Search
None
See application file for complete search history.

(56) References Cited

U.S. PATENT DOCUMENTS

| 5,527,761 A | 6/1996 | Ensminger |
|---|---|---|
| 2008/0153704 A1 | 6/2008 | Yamaji et al. |
| 2014/0031231 A1 | 1/2014 | Liu et al. |

FOREIGN PATENT DOCUMENTS

| EP | 0958742 A1 | 11/1999 |
|---|---|---|
| WO | 01/50858 A2 | 7/2001 |
| WO | 03/028460 A2 | 4/2003 |
| WO | 2009/135492 A2 | 11/2009 |
| WO | 2012/148689 A2 | 11/2012 |
| WO | 2014/018400 A1 | 1/2014 |
| WO | 2015/127259 A1 | 8/2015 |

OTHER PUBLICATIONS

Weed Research, vol. 26, pp. 441-445, 1986.
The Pesticide Manual, 16th Edition, The British Crop Protection Council and the Royal Soc. of Chemistry, 2006. [Voluminous Book].
International Search Report in corresponding application No. PCT/EP2016/068598 dated Dec. 6, 2016.

*Primary Examiner* — Alton N Pryor
(74) *Attorney, Agent, or Firm* — McBee Moore & Vanik IP, LLC

(57) ABSTRACT

The present invention is directed to new uses of the herbicidal active compound 2-(2,4-dichlorophenyl)methyl-4,4-dimethyl-3-isoxazolidone (compound I) as foliar herbicide. Furthermore, the present invention is directed to combinations comprising active compound 2-(2,4-dichlorophenyl)methyl-4,4-dimethyl-3-isoxazolidone (compound I) and to a method for controlling undesired weeds by applying the herbicidal active compound 2-(2,4-dichlorophenyl)methyl-4,4-dimethyl-3-isoxazolidone (compound I) or combinations comprising compound I to weeds or to the area in which the weeds grow after emergence of the crop.

16 Claims, No Drawings

USES OF 2-(2,4-DICHLOROPHENYL) METHYL-4,4-DIMETHYL-3-ISOXAZOLIDONE AS FOLIAR HERBICIDE

CROSS REFERENCE TO RELATED APPLICATIONS

This application is a Divisional Application of U.S. application Ser. No. 15/750,221, filed 5 Feb. 2018, which is a National Stage entry of International Application No. PCT/EP2016/068598 filed 4 Aug. 2016, which claims priority to European Patent Application No. 15180105.7, filed 7 Aug. 2015. The disclosure of the priority applications are incorporated in their entirety herein by reference.

BACKGROUND

Field

The present invention is directed to new uses of the herbicidal active compound 2-(2,4-dichlorophenyl)methyl-4,4-dimethyl-3-isoxazolidone (compound I) as foliar herbicide. Furthermore, the present invention is directed to combinations comprising active compound 2-(2,4-dichlorophenyl)methyl-4,4-dimethyl-3-isoxazolidone (compound I) and to a method for controlling undesired weeds by applying the herbicidal active compound 2-(2,4-dichlorophenyl)methyl-4,4-dimethyl-3-isoxazolidone (compound I) or combinations comprising compound I to weeds or to the area in which the weeds grow after emergence of the crop.

Description of Related Art

It is already known that certain 3-isoxazolidinones, including also the compound of the present invention show a selective herbicidal activity against grass or brassica crops (WO 2012/148689), however only in the form of pre-emergence application of these crops. There is still a need to broaden the applicability of herbicides such as 3-isoxazolidones, especially for the control of difficult weeds or weeds showing herbicide resistance.

SUMMARY

The present invention addresses such need. Surprisingly and unforeseen, it has been found that compound I according to the invention can also be applied as post-emergence application allowing not only root activity but also foliar activity. The present invention therefore provides a new method for controlling undesired weeds or plants by applying compound I as post-emergence application directly to the plants or to the area in which the plants grow. Thus, the present invention is directed to a new use of 2-(2,4-dichlorophenyl)methyl-4,4-dimethyl-3-isoxazolidone as foliar herbicide.

DETAILED DESCRIPTION OF A PREFERRED EMBODIMENT

Further, it has been found that control of undesired weeds is even more enhanced by adding one or more herbicidal active ingredients as mixing partners to compound I. Thus, the present invention is also directed to a new use and a method for controlling undesired weeds by applying a combination of compound I with at least one further herbicidal active ingredient as post emergence application. This has been found to be especially beneficial for the control of difficult weeds.

Further, spectrum of applicability of compound I or combinations comprising compound I for the control of undesired weeds can even be extended by adding a safener. This has been found to be especially beneficial for the control of difficult weeds by avoiding or, if at all, considerably reducing phytotoxicity to the crops to be protected. Thus, the present invention is directed to new uses of compound I or combinations comprising compound I and at least one safener as foliar herbicide for cereals, corn and rice crops.

The combinations according to the invention comprise 2-(2,4-dichlorophenyl)methyl-4,4-dimethyl-3-isoxazolidone (compound I) and at least one further herbicidal active ingredient of group IIa: aclonifen, bromoxynil, bromoxynil-butyrate, -potassium, -heptanoate, and -octanoate, benzofenap, butachlor, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, diflufenican, dimethenamid, ethoxysulfuron, fenoxaprop, fenoxaprop-P, fenoxaprop-ethyl, fenoxaprop-P-ethyl, fenquinotrione, fentrazamide, florasulam, flufenacet, fluroxypyr, fluroxypyr-meptyl, foramsulfuron, iodosulfuron, iodosulfuron-methyl-sodium, isoproturon, isoxaflutole, mefenacet, me sosulfuron, mesosulfuron-methyl, metolachlor, S-metolachlor, metribuzin, metosulam, nicosulfuron, oxadiargyl, oxadiazon, pethoxamid, prosulfocarb, pyrasulfotole, pyroxsulam, tefuryltrione, tembotrione, thiencarbazone, thiencarbazone-methyl, and triafamone.

A further aspect of the invention are combinations comprising 2-(2,4-dichlorophenyl)methyl-4,4-dimethyl-3-isoxazolidone (compound I) and at least one further herbicidal active ingredient of group IIb: pendimethalin, propoxycarbazone, halauxifen-methyl, 2-methyl-4-chlorophenoxyacetic acid (MCPA).

A further aspect of the invention are combinations comprising 2-(2,4-dichlorophenyl)methyl-4,4-dimethyl-3-isoxazolidone (compound I) and at least one further herbicidal active ingredient of group IIa or IIb and at least one safener of group III: isoxadifen-ethyl, cyprosulfamide, cloquintocet-mexyl and mefenpyr-diethyl.

A further aspect of the invention are combinations comprising 2-(2,4-dichlorophenyl)methyl-4,4-dimethyl-3-isoxazolidone (compound I) and at least one safener of group III: isoxadifen-ethyl, cyprosulfamide, cloquintocet-mexyl, and mefenpyr-diethyl.

Herbicidal active ingredients of group IIa/IIb or safeners of group III are known active compounds as they are described in, for example, Weed Research 26, 441-445 (1986), or "The Pesticide Manual", 16th edition, The British Crop Protection Council and the Royal Soc. of Chemistry, 2006, and the literature cited therein.

Definitions

Herbicidal Active Ingredient (Group IIa):
aclonifen, bromoxynil, bromoxynil-butyrate, -potassium, -heptanoate, and -octanoate, benzofenap, butachlor, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, diflufenican, dimethenamid, ethoxysulfuron, fenoxaprop, fenoxaprop-P, fenoxaprop-ethyl, fenoxaprop-P-ethyl, fenquinotrione, fentrazamide, florasulam, flufenacet, fluroxypyr, fluroxypyr-meptyl, foramsulfuron, iodosulfuron, iodosulfuron-methyl-sodium, isoproturon, isoxaflutole, mefenacet, mesosulfuron, mesosulfuron-methyl, metolachlor, S-metolachlor, metribuzin, metosulam, nicosulfuron, oxadiargyl, oxadiazon, pethoxamid, prosulfocarb, pyrasulfotole, pyroxsulam, tefuryltrione, tembotrione, thiencarbazone, thiencarbazone-methyl, and triafamone.

Herbicidal Active Ingredient (Group IIb):
pendimethalin, propoxycarbazone, halauxifen-methyl, 2-methyl-4-chlorophenoxyacetic acid (MCPA).

Safeners:

S1) Compounds of the group of heterocyclic carboxylic acid derivatives:

S1$^a$) Compounds of the type of dichlorophenylpyrazoline-3-carboxylic acid (S1$^a$), preferably compounds such as 1-(2,4-dichlorophenyl)-5-(ethoxycarbonyl)-5-methyl-2-pyrazoline-3-carboxylic acid, ethyl 1-(2,4-dichlorophenyl)-5-(ethoxy carbonyl)-5-methyl-2-pyrazoline-3-carboxylate (S1-1) ("mefenpyr(-diethyl)"), and related compounds, as described in WO-A-91/07874;

S1$^b$) Derivatives of dichlorophenylpyrazolecarboxylic acid (SP), preferably compounds such as ethyl 1-(2,4-dichlorophenyl)-5-methylpyrazole-3-carboxylate (S1-2), ethyl 1-(2,4-dichlorophenyl)-5-isopropylpyrazole-3-carboxylate (S1-3), ethyl 1-(2,4-dichlorophenyl)-5-(1,1-dimethylethyppyrazole-3-carboxylate (S1-4) and related compounds, as described in EP-A-333 131 and EP-A-269 806;

S1$^c$) Derivatives of 1,5-diphenylpyrazole-3-carboxylic acid (Sic), preferably compounds such as ethyl 1-(2,4-dichlorophenyl)-5-phenylpyrazole-3-carboxy late (S1-5), methyl 1-(2-chlorophenyl)-5-phenylpyrazole-3-carboxylate (S1-6) and related compounds, as described, for example, in EP-A-268554;

S1$^d$) Compounds of the type of triazolecarboxylic acids (S1$^d$), preferably compounds such as fenchlorazole (-ethyl), i.e. ethyl 1-(2,4-dichlorophenyl)-5-trichloromethy 1-(1H)-1,2,4-triazole-3-carboxy late (S1-7), and related compounds, as described in EP-A-174 562 and EP-A-346 620;

S1$^e$) Compounds of the type of 5-benzyl- or 5-phenyl-2-isoxazoline-3-carboxylic acid or 5,5-diphenyl-2-isoxazoline-3-carboxylic acid (S1$^3$), preferably compounds such as ethyl 5-(2,4-dichlorobenzyl)-2-isoxazoline-3-carboxylate (S1-8) or ethyl 5-phenyl-2-isoxazoline-3-carboxylate (S1-9) and related compounds, as described in WO-A-91/08202, or 5,5-diphenyl-2-isoxazolinecarboxylic acid (S1-10) or ethyl 5,5-diphenyl-2-isoxazolinecarboxylate (S1-11) ("isoxadifen-ethyl") or n-propyl 5,5-diphenyl-2-isoxazolinecarboxylate (S1-12) or ethyl 5-(4-fluorophenyl)-5-phenyl-2-isoxazoline-3-carboxylate (S1-13), as described in the patent application WO-A-95/07897.

S2) Compounds of the group of 8-quinolinoxy derivatives (S2):

S2$^a$) Compounds of the type of 8-quinolinoxyacetic acid (S2$^a$), preferably 1-methylhexyl (5-chloro-8-quinolinoxy)acetate (common name "cloquintocet-mexyl" (S2-1), 1,3-dimethyl-but-1-yl (5-chloro-8-quinolinoxy)acetate (S2-2), 4-allyloxybutyl (5-chloro-8-quinolinoxy)acetate (S2-3), 1-allyloxyprop-2-yl(5-chloro-8-quinolinoxy)acetate (S2-4), ethyl (5-chloro-8-quinolinoxy)acetate (S2-5), methyl (5-chloro-8-quinolinoxy)acetate (S2-6), allyl (5-chloro-8-quinolinoxy)acetate (S2-7), 2-(2-propylideneiminoxy)-1-ethyl(5-chloro-8-quinolinoxy)acetate (S2-8), 2-oxoprop-1-yl(5-chloro-8-quinolinoxy)acetate (S2-9) and related compounds, as described in EP-A-86 750, EP-A-94 349 and EP-A-191 736 or EP-A-0 492 366, and also (5-chloro-8-quinolinoxy)acetic acid (S2-10), its hydrates and salts, for example its lithium, sodium, potassium, calcium, magnesium, aluminium, iron, ammonium, quaternary ammonium, sulphonium or phosphonium salts, as described in WO-A-2002/34048;

S2$^b$) Compounds of the type of (5-chloro-8-quinolinoxy) malonic acid (S2$^b$), preferably compounds such as diethyl (5-chloro-8-quinolinoxy)malonate, diallyl (5-chloro-8-quinolinoxy)malonate, methyl ethyl (5-chloro-8-quinolinoxy)malonate and related compounds, as described in EP-A-0 582 198.

S3) Active compounds of the type of dichloroacetamides (S3) which are frequently used as pre-emergence safeners (soil-acting safeners), such as, for example, "dichlormid" (N,N-diallyl-2,2-dichloroacetamide) (S3-1), "R-29148" (3-dichloroacetyl-2,2,5-trimethyl-1,3-oxazolidine) (S3-2), "R-28725" (3-dichloroacetyl-2,2-dimethyl-1,3-oxazolidine) (S3-3), "benoxacor" (4-dichloroacetyl-3,4-dihydro-3-methyl-2H-1,4-benzoxazine) (S3-4), "PPG-1292" (N-allyl-N-[(1,3-dioxolan-2-yl)methyl]dichloroacetamide) (S3-5), "DKA-24" (N-allyl-N-Kallylaminocarbonyflmethylidichloroacetamide) (S3-6), "AD-67" or "MON 4660" (3-dichloroacetyl-1-oxa-3-aza-spiro[4,5]decane) (S3-7), "TI-35" (1-dichloroacetylazepane) (S3-8) "diclonon" (dicyclonon) (S3-9) ((RS)-1-dichloroacetyl-3,3,8a-trimethylperhydropyrrolo[1,2-a]pyrimidin-6-one), furilazole" or "MON 13900" ((RS)-3-dichloroacetyl-5-(2-furyl)-2,2-dimethyloxazolidine) (S3-10), and also its (R)-isomer (S3-11).

S4) Compounds of the class of acylsulphonamides (S4):

S4a) N-acylsulphonamides of the formula (S4$^a$) and salts thereof, as described in WO-A-97/45016

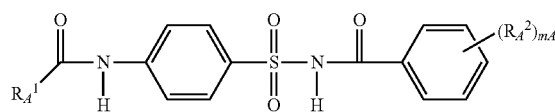

(S4$^a$)

in which $R_A^1$ is $(C_1-C_6)$-alkyl, $(C_3-C_6)$-cycloalkyl, where the 2 last-mentioned radicals are substituted by $v_A$ substituents from the group consisting of halogen, $(C_1-C_4)$-alkoxy, halo-$(C_1-C_6)$-alkoxy and $(C_1-C_4)$-alkylthio and, in the case of cyclic radicals, also $(C_1-C_4)$-alkyl and $(C_1-C_4)$-haloalkyl;

$R_A^2$ is halogen, $(C_1-C_4)$-alkyl, $(C_1-C_4)$-alkoxy, $CF_3$, $m_A$ is 1 or 2;

$v_D$ is 0, 1, 2 or 3;

S4$^b$) Compounds of the type of 4-(benzoylsulphamoyl) benzamides of the formula (S4$^b$) and salts thereof, as described in WO-A-99/16744,

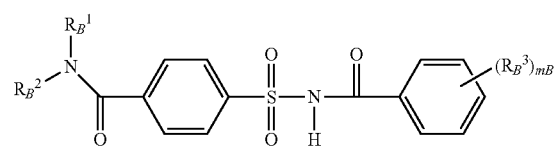

(S4$^b$)

in which $R_B^1$, $R_B^2$ independently of one another are hydrogen, $(C_1-C_6)$-alkyl, $(C_3-C_6)$-cycloalkyl, $(C_3-C_6)$-alkenyl, $(C_3-C_6)$-alkynyl, $R_B^3$ is halogen, $(C_1-C_4)$-alkyl, $(C_1-C_4)$-haloalkyl or $(C_1-C_4)$-alkoxy, $m_B$ is 1 or 2;

for example those in which $R_B^1$=cyclopropyl, $R_B^2$=hydrogen and $(R_B^3)$=2-OMe ("cyprosulfamide", S4-1), $R_B^1$=cyclopropyl, $R_B^2$=hydrogen and $(R_B^3)$=5-Cl-2-OMe (S4-2), $R_B^1$=ethyl, $R_B^2$=hydrogen and $(R_B^3)$=2-OMe (S4-3), $R_B^1$=isopropyl, $R_B^2$=hydrogen and $(R_B^3)$=5-Cl-2-OMe (S4-4) and $R_B^1$=isopropyl, $R_B^2$=hydrogen and $(R_B^3)$=2-OMe (S4-5);

S4$^c$) Compounds of the class of benzoylsulphamoylphenylureas of the formula (S4') as described in EP-A-365484, (S4$^c$)

in which $R_C^1$, $R_C^2$ independently of one another are hydrogen, $(C_1-C_8)$-alkyl, $(C_3-C_8)$-cycloalkyl, $(C_3-C_6)$-alkenyl, $(C_3-C_6)$-alkynyl, $R_C^3$ is halogen, $(C_1-C_4)$-alkyl, $(C_1-C_4)$-alkoxy, $CF_3$, $m_C$ is 1 or 2;

for example

1-[4-(N-2-methoxybenzoylsulphamoyl)phenyl]-3-methylurea, 1-[4-(N-2-methoxybenzoylsulphamoyl)phenyl]-3,3-dimethylurea, 1-[4-(N-4,5-dimethylbenzoylsulphamoyl)phenyl]-3-methylurea;

S4$^d$) Compounds of the type of N-phenylsulphonylterephthalamides of the formula (S4$^d$) and salts thereof, which are known, for example, from CN 101838227, (S4$^d$)

in which $R_D^4$ is halogen, $(C_1-C_4)$-alkyl, $(C_1-C_4)$-alkoxy, $CF_3$;

$m_D$ is 1 or 2;

$R_D^5$ is hydrogen, $(C_1-C_6)$-alkyl, $(C_3-C_6)$-cycloalkyl, $(C_2-C_6)$-alkenyl, $(C_2-C_6)$-alkynyl, $(C_5-C_6)$-cycloalkenyl.

S5) Active compounds from the class of hydroxyaromatics and aromatic-aliphatic carboxylic acid derivatives (S5), for example ethyl 3,4,5-triacetoxybenzoate, 3,5-dimethoxy-4-hydroxybenzoic acid, 3,5-dihydroxybenzoic acid, 4-hydroxysalicylic acid, 4-fluorosalicyclic acid, 2-hydroxycinnamic acid, 2,4-dichlorocinnamic acid, as described in WO-A-2004/084631, WO-A-2005/015994, WO-A-2005/016001.

S6) Active compounds from the class of 1,2-dihydroquinoxalin-2-ones (S6), for example 1-methyl-3-(2-thienyl)-1,2-dihydroquinoxalin-2-one, 1-methyl-3-(2-thienyl)-1,2-dihydroquinoxaline-2-thione, 1-(2-aminoethyl)-3-(2-thienyl)-1,2-dihydroquinoxalin-2-one hydrochloride, 1-(2-methylsulphonylaminoethyl)-3-(2-thienyl)-1,2-dihydroquinoxalin-2-one, as described in WO-A-2005/112630.

S7) Compounds from the class of diphenylmethoxyacetic acid derivatives (S7), for example methyl diphenylmethoxyacetate (CAS-Reg. Nr. 41858-19-9) (S7-1), ethyl diphenylmethoxyacetate, or diphenylmethoxyacetic acid, as described in WO-A-98/38856.

S8) Compounds of the formula (S8), as described in WO-A-98/27049, (S8)

where the symbols and indices have the following meanings:

$R_D^1$ is halogen, $(C_1-C_4)$-alkyl, $(C_1-C_4)$-haloalkyl, $(C_1-C_4)$-alkoxy, $(C_1-C_4)$-haloalkoxy, $R_D^2$ is hydrogen or $(C_1-C_4)$-alkyl, $R_D^3$ is hydrogen, $(C_1-C_8)$-alkyl, $(C_2-C_4)$-alkenyl, $(C_2-C_4)$-alkynyl or aryl, where each of the carbon-containing radicals mentioned above is unsubstituted or substituted by one or more, preferably by up to three, identical or different radicals from the group consisting of halogen and alkoxy; or salts thereof, $n_D$ is an integer from 0 to 2.

S9) Active compounds from the class of 3-(5-tetrazolylcarbonyl)-2-quinolones (S9), for example 1,2-dihydro-4-hydroxy-1-ethyl-3-(5-tetrazolylcarbonyl)-2-quinolone (CAS Reg. No.: 219479-18-2), 1,2-dihydro-4-hydroxy-1-methyl-3-(5-tetrazolylcarbonyl)-2-quinolone (CAS Reg. No.: 95855-00-8), as described in WO-A-1999/000020.

S10) Compounds of the formula (S10$^a$) or (S10$^b$) as described in WO-A-2007/023719 and WO-A-2007/023764

(S10$^a$)

(S10$^b$)

in which
$R_E^1$ is halogen, $(C_1-C_4)$-alkyl, methoxy, nitro, cyano, $CF_3$, $OCF_3$,
$Y_E$, $Z_E$ independently of one another are O or S,
$n_E$ is an integer from 0 to 4,
$R_E^2$ is $(C_1-C_{16})$-alkyl, $(C_2-C_6)$-alkenyl, $(C_3-C_6)$-cycloalkyl, aryl; benzyl, halobenzyl,
$R_E^3$ is hydrogen or $(C_1-C_6)$-alkyl.

S11) Active compounds of the type of oxyimino compounds (S11), which are known as seed dressings, such as, for example, "oxabetrinil" ((Z)-1,3-dioxolan-2-ylmethoxyimino-(phenyl)acetonitrile) (S11-1), which is known as seed dressing safener for millet against metolachlor damage, "fluxofenim" (1-(4-chlorophenyl)-2,2,2-trifluoro-1-ethanone O-(1,3-dioxolan-2-ylmethyl)oxime) (S11-2), which is known as seed dressing safener for millet against metolachlor damage, and "cyometrinil" or "CGA-43089" ((Z)-cyanomethoxyimino(phenyl)acetonitrile) (S11-3), which is known as seed dressing safener for millet against metolachlor damage.

S12) Active compounds from the class of isothiochromanones (S12), such as, for example, methyl [(3-oxo-1H-2-benzothiopyran-4(3H)-ylidene)methoxy]acetate (CAS Reg. No.: 205121-04-6) (S12-1) and related compounds from WO-A-1998/13361.

S13) One or more compounds from group (S13):
"naphthalic anhydrid" (1,8-naphthalenedicarboxylic anhydride) (S13-1), which is known as seed dressing safener for corn against thiocarbamate herbicide damage, "fenclorim" (4,6-dichloro-2-phenylpyrimidine) (S13-2), which is known as safener for pretilachlor in sown rice, "flurazole" (benzyl 2-chloro-4-trifluoromethyl-1,3-thiazole-5-carboxylate) (S13-3), which is known as seed dressing safener for millet against alachlor and metolachlor damage, "CL 304415" (CAS Reg. No.: 31541-57-8) (4-carboxy-3,4-dihydro-2H-1-benzopyran-4-acetic acid) (S13-4) from American Cyanamid, which is known as safener for corn against imidazolinone damage, "MG 191" (CAS Reg. No.: 96420-72-3) (2-dichloromethyl-2-methyl-1,3-dioxolane) (S13-5) which is known as safener for corn, "MG 838" (CAS Reg. No.: 133993-74-5) (2-propenyl 1-oxa-4-azaspiro[4.5]decane-4-carbodithioate) (S13-6), "disulphoton" (O,O-diethyl S-2-ethylthioethyl phosphorodithioate) (S13-7), "dietholate" (O,O-diethyl O-phenyl phosphorothioate) (S13-8), "mephenate" (4-chlorophenyl methylcarbamate) (S13-9).

S14) Active compounds which, besides a herbicidal effect against harmful plants, also have a safener effect on crop plants such as rice, such as, for example, "dimepiperate" or "MY 93" (S-1-methyl-1-phenylethyl piperidine-1-carbothioate), which is known as safener for rice against molinate herbicide damage, "daimuron" or "SK 23" (1-(1-methyl-1-phenylethyl)-3-p-tolylurea), which is known as safener for rice against imazosulphuron herbicide damage, "cumyluron"="JC 940" (3-(2-chlorophenylmethyl)-1-(1-methyl-1-phenylethyl)urea, see JP-A-60087254), which is known as safener for rice against some herbicide damage, "methoxyphenone" or "NK 049" (3,3'-dimethyl-4-methoxybenzophenone), which is known as safener for rice against some herbicide damage, "CSB" (1-bromo-4-(chloromethylsulphonyl)benzene) from Kumiai (CAS Reg. No. 54091-06-4), which is known as safener against some herbicide damage in rice.

S15) Compounds of the formula (S15) or its tautomers,

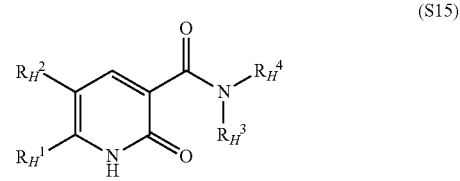

as described in WO-A-2008/131861 and WO-A-2008/131860,
in which
$R_H^1$ is $(C_1-C_6)$-haloalkyl,
$R_H^2$ is hydrogen or halogen,
$R_H^3$, $R_H^4$ independently of one another are hydrogen, $(C_1-C_{16})$-alkyl, $(C_2-C_{16})$-alkenyl or $(C_2-C_{16})$-alkynyl,
where each of the 3 last-mentioned radicals is unsubstituted or substituted by one or more radicals from the group consisting of halogen, hydroxy, cyano, $(C_1-C_4)$-alkoxy, $(C_1-C_4)$-haloalkoxy, $(C_1-C_4)$-alkylthio, $(C_1-C_4)$-alkylamino, di-[$(C_1-C_4)$-alkyl]-amino, [$(C_1-C_4)$-alkoxy]-carbonyl, [$(C_1-C_4)$-haloalkoxy]-carbonyl, unsubstituted or substituted $(C_3-C_6)$-cycloalkyl, unsubstituted or substituted phenyl, and unsubstituted or substituted heterocyclyl;

or $(C_3-C_6)$-cycloalkyl, $(C_4-C_6)$-cycloalkenyl, $(C_3-C_6)$-cycloalkyl which is at one site of the ring condensed with a 4 to 6-membered saturated or unsaturated carbocyclic ring, or $(C_4-C_6)$-cycloalkenyl which is at one site of the ring condensed with a 4 to 6-membered saturated or unsaturated carbocyclic ring, where each of the 4 last-mentioned radicals is unsubstituted or substituted by one or more radicals from the group consisting of halogen, hydroxy, cyano, $(C_1-C_4)$-alkyl, $(C_1-C_4)$-haloalkyl, $(C_1-C_4)$-alkoxy, $(C_1-C_4)$-haloalkoxy, $(C_1-C_4)$-alkylthio, $(C_1-C_4)$-alkylamino, di-$(C_1-C_4)$-alkyl]-amino, [$(C_1-C_4)$-alkoxy]-carbonyl, [$(C_1-C_4)$-haloalkoxy]-carbonyl, unsubstituted or substituted $(C_3-C_6)$-cycloalkyl, unsubstituted or substituted phenyl, and unsubstituted or substituted heterocyclyl; or $R_H^3$ is $(C_1-C_4)$-alkoxy, $(C_2-C_4)$-alkenyloxy, $(C_2-C_6)$-alkynyloxy or $(C_2-C_4)$-haloalkoxy, and $R_H^4$ is hydrogen or $(C_1-C_4)$-alkyl, or $R_H^3$ and $R_H^4$ together with the directly bound N-atom are a 4 to 8-membered heterocyclic ring, which can contain further hetero ring atoms besides the N-atom, preferably up to two further hetero ring atoms from the group consisting of N, O and S, and which is unsubstituted or substituted by one or more radicals from the group consisting of halogen, cyano, nitro, $(C_1-C_4)$-alkyl, $(C_1-C_4)$-haloalkyl, $(C_1-C_4)$-alkoxy, $(C_1-C_4)$-haloalkoxy, and $(C_1-C_4)$-alkylthio.

Safeners (Group III):
Isoxadifen-ethyl, cyprosulfamide, mefenpyr-diethyl and cloquintocet-mexyl including its hydrates and salts, for example its lithium, sodium, potassium, calcium, magnesium, aluminium, iron, ammonium, quaternary ammonium, sulphonium or phosphonium salts.

Preference is also given to the use as post-emergence application of combinations comprising compound (I) and optionally one further active ingredient of group IIa and one safener of group III whereas the safener is Mefenpyr-diethyl.

Preference is also given to the use as post-emergence application of combinations comprising compound (I) and optionally one further active ingredient of group IIa and one safener of group III whereas the safener is Isoxadifen-ethyl.

Preference is also given to the use as post-emergence application of combinations comprising compound (I) and optionally one further active ingredient of group IIa and one safener of group III whereas the safener is Cyprosulfamide.

Further preference is given to the use as post-emergence application of combinations according to the invention comprising compound (I) and at least one further herbicidal active ingredient of group IIaa: aclonifen, bromoxynil, bromoxynil-butyrate, -potassium, -heptanoate, and -octanoate, butachlor, diflufenican, dimethenamid, ethoxysulfuron, fenoxaprop, fenoxaprop-P, fenoxaprop-ethyl, fenoxaprop-P-ethyl, fenquinotrione, fentrazamide, florasulam, flufenacet, fluroxypyr, fluroxypyr-meptyl, foramsulfuron, iodosulfuron, iodosulfuron-methyl-sodium, isoproturon, isoxaflutole, mesosulfuron, mesosulfuron-methyl, metolachlor, S-metolachlor, metribuzin, metosulam, nicosulfuron, pethoxamid, prosulfocarb, pyrasulfotole, pyroxsulam, tefuryltrione, tembotrione, thiencarbazone, thiencarbazone-methyl, and triafamone.

Even further preference is given to the use as post-emergence application of combinations according to the invention comprising compound (I) and at least one further herbicidal active ingredient of group IIaaa: aclonifen, bromoxynil, bromoxynil-butyrate, -potassium, -heptanoate, and -octanoate, diflufenican, ethoxysulfuron, fenoxaprop, fenoxaprop-P, fenoxaprop-ethyl, fenoxaprop-P-ethyl, florasulam, fluroxypyr, fluroxypyr-meptyl, foramsulfuron, iodosulfuron, iodosulfuron-methyl-sodium, mesosulfuron, mesosulfuron-methyl, metribuzin, metosulam, nicosulfuron, tefuryltrione, tembotrione, thiencarbazone, thiencarbazone-methyl, and triafamone.

Even further preference is also given to the use as post-emergence application of combinations according to the invention comprising compound (I) and one further herbicidal active ingredient of group IIaaa: aclonifen, bromoxynil, bromoxynil-butyrate, -potassium, -heptanoate, and -octanoate, diflufenican, ethoxysulfuron, fenoxaprop, fenoxaprop-P, fenoxaprop-ethyl, fenoxaprop-P-ethyl, florasulam, fluroxypyr, fluroxypyr-meptyl, foramsulfuron, iodosulfuron, iodosulfuron-methyl-sodium, mesosulfuron, mesosulfuron-methyl, metribuzin, metosulam, nicosulfuron, tefuryltrione, tembotrione, thiencarbazone, thiencarbazone-methyl, triafamone and one safener of group III: Isoxadifen-ethyl, Cyprosulfamide, Mefenpyr-diethyl and cloquintocet-mexyl.

Preferred are combinations comprising 2-(2,4-dichlorophenyl)methyl-4,4-dimethyl-3-isoxazolidone (compound I) and Mefenpyr-diethyl.

Preferred are also combinations comprising 2-(2,4-dichlorophenyl)methyl-4,4-dimethyl-3-isoxazolidone (compound I) and flufenacet.

Preferred are also combinations comprising 2-(2,4-dichlorophenyl)methyl-4,4-dimethyl-3-isoxazolidone (compound I) and prosulfocarb.

Preferred are also combinations comprising 2-(2,4-dichlorophenyl)methyl-4,4-dimethyl-3-isoxazolidone (compound I) and pendimethalin.

Preferred are also combinations comprising 2-(2,4-dichlorophenyl)methyl-4,4-dimethyl-3-isoxazolidone (compound I) and diflufenican.

Preferred are also combinations comprising 2-(2,4-dichlorophenyl)methyl-4,4-dimethyl-3-isoxazolidone (compound I) and aclonifen.

Preferred is also a combination comprising 2-(2,4-dichlorophenyl)methyl-4,4-dimethyl-3-isoxazolidone (compound I) and metribuzin.

Preferred are also combinations comprising 2-(2,4-dichlorophenyl)methyl-4,4-dimethyl-3-isoxazolidone (compound I) and propoxycarbazone.

Preferred are also combinations comprising 2-(2,4-dichlorophenyl)methyl-4,4-dimethyl-3-isoxazolidone (compound I) and thiencarbazone-methyl.

Preferred are also combinations comprising 2-(2,4-dichlorophenyl)methyl-4,4-dimethyl-3-isoxazolidone (compound I) and fenoxaprop.

Preferred are also combinations comprising 2-(2,4-dichlorophenyl)methyl-4,4-dimethyl-3-isoxazolidone (compound I) and bromoxynil.

Preferred are also combinations comprising 2-(2,4-dichlorophenyl)methyl-4,4-dimethyl-3-isoxazolidone (compound I) and halauxifen-methyl.

Preferred are also combinations comprising 2-(2,4-dichlorophenyl)methyl-4,4-dimethyl-3-isoxazolidone (compound I) and 2,4-D.

Preferred are also combinations comprising 2-(2,4-dichlorophenyl)methyl-4,4-dimethyl-3-isoxazolidone (compound I) and 2-methyl-4-chlorophenoxyacetic acid.

Preferred are also combinations comprising 2-(2,4-dichlorophenyl)methyl-4,4-dimethyl-3-isoxazolidone (compound I), flufenacet and at least one safener of group III.

Preferred are also combinations comprising 2-(2,4-dichlorophenyl)methyl-4,4-dimethyl-3-isoxazolidone (compound I), prosulfocarb and at least one safener of group III.

Preferred are also combinations comprising 2-(2,4-dichlorophenyl)methyl-4,4-dimethyl-3-isoxazolidone (compound I), pendimethalin and at least one safener of group III.

Preferred are also combinations comprising 2-(2,4-dichlorophenyl)methyl-4,4-dimethyl-3-isoxazolidone (compound I), diflufenican and at least one safener of group III.

Preferred are also combinations comprising 2-(2,4-dichlorophenyl)methyl-4,4-dimethyl-3-isoxazolidone (compound I), aclonifen and at least one safener of group III.

Preferred are also combinations comprising 2-(2,4-dichlorophenyl)methyl-4,4-dimethyl-3-isoxazolidone (compound I), metribuzin and at least one safener of group III.

Preferred are also combinations comprising 2-(2,4-dichlorophenyl)methyl-4,4-dimethyl-3-isoxazolidone (compound I), propoxycarbazone and at least one safener of group III.

Preferred are also combinations comprising 2-(2,4-dichlorophenyl)methyl-4,4-dimethyl-3-isoxazolidone (compound I), thiencarbazone-methyl and at least one safener of group III.

Preferred are also combinations comprising 2-(2,4-dichlorophenyl)methyl-4,4-dimethyl-3-isoxazolidone (compound I), fenoxaprop and at least one safener of group III.

Preferred are also combinations comprising 2-(2,4-dichlorophenyl)methyl-4,4-dimethyl-3-isoxazolidone (compound I), bromoxynil and at least one safener of group III.

Preferred are also combinations comprising 2-(2,4-dichlorophenyl)methyl-4,4-dimethyl-3-isoxazolidone (compound I), halauxifen-methyl and at least one safener of group III.

Preferred are also combinations comprising 2-(2,4-dichlorophenyl)methyl-4,4-dimethyl-3-isoxazolidone (compound I), 2,4-D and at least one safener of group III.

Preferred are also combinations comprising 2-(2,4-dichlorophenyl)methyl-4,4-dimethyl-3-isoxazolidone (compound I), 2-methyl-4-chlorophenoxyacetic acid and at least one safener of group III.

Preferred are also combinations comprising 2-(2,4-dichlorophenyl)methyl-4,4-dimethyl-3-isoxazolidone (compound I), flufenacet and pethoxamid.

Preferred are also combinations comprising 2-(2,4-dichlorophenyl)methyl-4,4-dimethyl-3-isoxazolidone (compound I), flufenacet and aclonifen.

Preferred are also combinations comprising 2-(2,4-dichlorophenyl)methyl-4,4-dimethyl-3-isoxazolidone (compound I), flufenacet and diflufenican.

Preferred are also combinations comprising 2-(2,4-dichlorophenyl)methyl-4,4-dimethyl-3-isoxazolidone (compound I), aclonifen and diflufenican.

Preferred are also combinations comprising 2-(2,4-dichlorophenyl)methyl-4,4-dimethyl-3-isoxazolidone (compound I), flufenacet and metribuzin.

Preferred are also combinations comprising 2-(2,4-dichlorophenyl)methyl-4,4-dimethyl-3-isoxazolidone (compound I), flufenacet and halauxifen-methyl.

Preferred are also combinations comprising 2-(2,4-dichlorophenyl)methyl-4,4-dimethyl-3-isoxazolidone (compound I), prosulfocarb and diflufenican.

Preferred are also combinations comprising 2-(2,4-dichlorophenyl)methyl-4,4-dimethyl-3-isoxazolidone (compound I), prosulfocarb and aclonifen.

Preferred are also combinations comprising 2-(2,4-dichlorophenyl)methyl-4,4-dimethyl-3-isoxazolidone (compound I), prosulfocarb and metribuzin.

Preferred are also combinations comprising 2-(2,4-dichlorophenyl)methyl-4,4-dimethyl-3-isoxazolidone (compound I), prosulfocarb and flufenacet.

Preferred are also combinations comprising 2-(2,4-dichlorophenyl)methyl-4,4-dimethyl-3-isoxazolidone (compound I), prosulfocarb and halauxifen-methyl.

Preferred are also combinations comprising 2-(2,4-dichlorophenyl)methyl-4,4-dimethyl-3-isoxazolidone (compound I), pendimethalin and diflufenican.

Preferred are also combinations comprising 2-(2,4-dichlorophenyl)methyl-4,4-dimethyl-3-isoxazolidone (compound I), pendimethalin and aclonifen.

Preferred are also combinations comprising 2-(2,4-dichlorophenyl)methyl-4,4-dimethyl-3-isoxazolidone (compound I), pendimethalin and metribuzin.

Preferred are also combinations comprising 2-(2,4-dichlorophenyl)methyl-4,4-dimethyl-3-isoxazolidone (compound I), pendimethalin and halauxifen-methyl.

Preferred are also combinations comprising 2-(2,4-dichlorophenyl)methyl-4,4-dimethyl-3-isoxazolidone (compound I), metribuzin and diflufenican.

Preferred are also combinations comprising 2-(2,4-dichlorophenyl)methyl-4,4-dimethyl-3-isoxazolidone (compound I), halauxifen-methyl and diflufenican.

Preferred are also combinations comprising 2-(2,4-dichlorophenyl)methyl-4,4-dimethyl-3-isoxazolidone (compound I), metribuzin and aclonifen.

Preferred are also combinations comprising 2-(2,4-dichlorophenyl)methyl-4,4-dimethyl-3-isoxazolidone (compound I), halauxifen-methyl and aclonifen.

Preferred are also combinations comprising 2-(2,4-dichlorophenyl)methyl-4,4-dimethyl-3-isoxazolidone (compound I), flufenacet and diflufenican and at least one safener of group III.

Preferred are also combinations comprising 2-(2,4-dichlorophenyl)methyl-4,4-dimethyl-3-isoxazolidone (compound I), aclonifen and diflufenican and at least one safener of group III.

Preferred are also combinations comprising 2-(2,4-dichlorophenyl)methyl-4,4-dimethyl-3-isoxazolidone (compound I), flufenacet, aclonifen and at least one safener of group III.

Preferred are also combinations comprising 2-(2,4-dichlorophenyl)methyl-4,4-dimethyl-3-isoxazolidone (compound I), flufenacet, metribuzin and at least one safener of group III.

Preferred are also combinations comprising 2-(2,4-dichlorophenyl)methyl-4,4-dimethyl-3-isoxazolidone (compound I), flufenacet, halauxifen-methyl and at least one safener of group III.

Preferred are also combinations comprising 2-(2,4-dichlorophenyl)methyl-4,4-dimethyl-3-isoxazolidone (compound I), prosulfocarb, diflufenican and at least one safener of group III.

Preferred are also combinations comprising 2-(2,4-dichlorophenyl)methyl-4,4-dimethyl-3-isoxazolidone (compound I), prosulfocarb, aclonifen and at least one safener of group III.

Preferred are also combinations comprising 2-(2,4-dichlorophenyl)methyl-4,4-dimethyl-3-isoxazolidone (compound I), prosulfocarb, metribuzin and at least one safener of group III.

Preferred are also combinations comprising 2-(2,4-dichlorophenyl)methyl-4,4-dimethyl-3-isoxazolidone (compound I), prosulfocarb, flufenacet and at least one safener of group III.

Preferred are also combinations comprising 2-(2,4-dichlorophenyl)methyl-4,4-dimethyl-3-isoxazolidone (compound I), prosulfocarb, halauxifen-methyl and at least one safener of group III.

Preferred are also combinations comprising 2-(2,4-dichlorophenyl)methyl-4,4-dimethyl-3-isoxazolidone (compound I), pendimethalin, diflufenican and at least one safener of group III.

Preferred are also combinations comprising 2-(2,4-dichlorophenyl)methyl-4,4-dimethyl-3-isoxazolidone (compound I), pendimethalin, aclonifen and at least one safener of group III.

Preferred are also combinations comprising 2-(2,4-dichlorophenyl)methyl-4,4-dimethyl-3-isoxazolidone (compound I), pendimethalin, metribuzin and at least one safener of group III.

Preferred are also combinations comprising 2-(2,4-dichlorophenyl)methyl-4,4-dimethyl-3-isoxazolidone (compound I), pendimethalin, halauxifen-methyl and at least one safener of group III.

Preferred are also combinations comprising 2-(2,4-dichlorophenyl)methyl-4,4-dimethyl-3-isoxazolidone (compound I), metribuzin, diflufenican and at least one safener of group III.

Preferred are also combinations comprising 2-(2,4-dichlorophenyl)methyl-4,4-dimethyl-3-isoxazolidone (compound I), halauxifen-methyl, diflufenican and at least one safener of group III.

Preferred are also combinations comprising 2-(2,4-dichlorophenyl)methyl-4,4-dimethyl-3-isoxazolidone (compound I), metribuzin, aclonifen and at least one safener of group III.

Preferred are also combinations comprising 2-(2,4-dichlorophenyl)methyl-4,4-dimethyl-3-isoxazolidone (compound I), halauxifen-methyl, aclonifen and at least one safener of group III.

The use of compound I or of the combinations according to the invention provides for excellent herbicidal effectiveness against a broad spectrum of economically important mono- and dicotyledonous annual weeds. Difficult-to-control perennial weeds which produce shoots from rhizomes, root stocks or other perennial organs are also well controlled by compound I or the combinations according to the invention.

The present invention therefore provides a method for controlling undesired plants or for regulating the growth of plants, preferably in plant crops, in which the compound I or the combinations according to the invention are applied to the plants (e.g. mono- or dicotyledonous weeds or undesired crop plants) or the area on which the plants grow. The compound I or the combinations according to the invention can be applied at different growth stages (GS) of the emerging plant allowing broadening of the applicability of the compound I or the combinations according to the invention, and providing for an efficient method of controlling undesired weeds or plants at different growth stages. The compound I or the combinations according to the invention can also be applied to the seed material (e.g. grains, seeds or vegetative propagation organs such as tubers or shoot parts with buds), e.g. in the pre-sowing method (optionally also through incorporation into the soil), or the area on which the plants grow (e.g. the area under cultivation), also as pre-emergence method. The present invention extends the applicability of compound I or the combinations according to the invention to post-emergence methods, naming without limitation early-post-emergence and mid- to late-post-emergence-periods.

Specifically, examples which may be mentioned are some of the representatives of mono- and dicotyledonous weed flora which can be controlled by the compound I or the combinations according to the invention, without a limitation to certain species being intended through the naming.

Monocotyledonous harmful plants of the genera: *Aegilops, Agropyron, Agrostis, Alopecurus, Apera, Avena, Brachiaria, Bromus, Cenchrus, Commelina, Cynodon, Cyperus, Dactyloctenium, Digitaria, Echinochloa, Eleocharis, Eleusine, Eragrostis, Eriochloa, Festuca, Fimbristylis, Heteranthera, Imperata, Ischaemum, Leptochloa, Lolium, Monochoria, Panicum, Paspalum, Phalaris, Phleum, Poa, Rottboellia, Sagittaria, Scirpus, Setaria*, and *Sorghum*.

Dicotyledonous harmful plants of the genera: *Abufilon, Amaranthus, Ambrosia, Anoda, Anthemis, Aphanes, Artemisia, Atriplex, Bellis, Bidens, Capsella, Carduus, Cassia, Centaurea, Chenopodium, Cirsium, Convolvulus, Datura, Desmodium, Emex, Erysimum, Euphorbia, Galeopsis, Galinsoga, Galium, Hibiscus, Ipomoea, Kochia, Lamium, Lepidium, Lindernia, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Solanum, Sonchus, Sphenoclea, Stellaria, Taraxacum, Thlaspi, Trifolium, Urtica, Veronica, Viola*, and *Xanthium*.

If the compound I or the combinations according to the invention are applied to the soil's surface prior to germination, then either the weed seedlings are prevented completely from emerging, or the weeds grow until they have reached the seed-leaf stage, but then their growth stops and finally, after three to four weeks have elapsed, they die completely.

For the new use as post-emergence application of the compound I or the combinations according to the invention to the green parts of the plants, growth likewise stops following treatment and the harmful plants remain at the growth stage at the time of application, or they die completely after a certain time, so that in this manner competition by the weeds, which is harmful to the crop plants, is eliminated very early on and in a lasting manner.

The compound I or combinations according to the invention can thus effectively be applied as post-emergence application for controlling undesired weed plant growth, preferably in crops such as cereals, maize, and rice. Combinations according to the invention comprising the safener Isoxadifen-ethyl can preferably be applied as post-emergence application in maize and rice; combinations according to the invention comprising the safener Mefenpyr-diethyl can preferably be applied as post-emergence application in cereals, naming without limitation wheat, rye, triticale, barley; and combinations according to the invention comprising the safener Cyprosulfamide or Isoxadifen-ethyl can preferably be applied as post-emergence application in maize.

Combinations according to the invention not only can beneficially be applied as post-emergence application, they surprisingly show also synergistic effects towards unwanted weed plants.

Moreover, compound I or the combinations according to the invention, depending on their particular structure and the application rate applied, have excellent growth regulatory properties in respect of crop plants. They intervene in a plant's metabolism in a regulatory fashion and can thus be used for the targeted influencing of plant ingredients and for facilitating harvesting, such as, for example, by triggering desiccation and stunted growth. Moreover, they are also suitable for generally controlling and inhibiting unwanted vegetative growth without destroying the plants in the process. Inhibiting the vegetative growth plays a large role in many monocotyledonous and dicotyledonous crops, allowing lodging to be reduced or prevented completely.

On account of their herbicidal and plant growth regulatory properties, the compound I or the combinations according to the invention can also be used for controlling harmful weeds in crops of genetically modified plants or in crops of plants being modified by conventional mutagenesis. As a rule, the transgenic plants are distinguished by particularly advantageous properties, for example by resistances to certain pesticides, primarily certain herbicides, resistances to plant diseases/pathogens or insects or microorganisms such as fungi, bacteria or viruses. Other particular properties relate, for example, to the harvested material with respect to quantity, quality, storability, composition and specific ingredients. Preference is given to using the compound I or the combinations according to the invention as post-emergence application in economically important crops of useful plants, for example of cereals such as wheat, barley, rye, oats, millet, rice, and maize.

Preferably, compound I or the combinations according to the invention can be used as herbicides in crops of useful plants which are resistant to, or have been rendered genetically resistant to, the phytotoxic effects of the herbicides.

Combinations or compositions according to the invention may comprise or else be used together with further components, examples being active crop protection ingredients of other kinds and/or adjuvants customary in crop protection and/or formulating auxiliaries. Combinations or compositions according to the invention can be produced by known methods, for example as mixed formulations of the individual components, optionally with further active ingredients, adjuvants and/or customary formulation assistants.

In the combinations or compositions of the invention, the application rate of compound I is customarily 10 to 500 g of active ingredient (a.i.) per hectare, preferably 25 to 250 g a.i./ha, especially preferably 50 to 200 g a.i./ha. The application rate of the further active ingredient of group IIa is customarily 2.5 to 2400 g of active ingredient per hectare, preferably 5 to 1000 g a.i./ha, especially preferably 5 to 500 g a. i./ha. At certain concentration ratios, the synergistic effect of the herbicidal compositions of the invention is particularly pronounced. However, the weight ratios of individual components can be varied within relatively wide ranges. Generally speaking, there are 1:240 to 200:1 parts by weight, preferably 1:40 to 50:1 parts by weight, especially preferably 1:10 to 40:1 of component I per part by weight of component of group IIa.

The application rate of a safener of group III is customarily 5 to 2500 g of active ingredient per hectare, preferably 5 to 1000 g a.i./ha, especially preferably 10 to 200 g a.i./ha. At certain concentration ratios, the antagonistic effect (=safening) of the herbicide/safener compositions of the invention related to the crops is particularly pronounced. However, the weight ratios of individual components can be varied within relatively wide ranges. Generally speaking, there are 1:250 to 100:1 parts by weight, preferably 1:40 to 50:1 parts by weight, especially preferably 1:4 to 20:1 of component I per part by weight of the safener of group III.

In the combinations or compositions of the invention, the application rate of compound I is customarily 10 to 500 g of active ingredient (a.i.) per hectare, preferably 25 to 350 g a.i./ha, especially preferably 50 to 300 g a.i./ha. The application rate of the further active ingredient of group IIa/IIb is customarily 2 to 2400 g of active ingredient per hectare, preferably 3 to 2000 g a.i./ha, especially preferably 3 to 1500 g a.i./ha. At certain concentration ratios, the synergistic effect of the herbicidal compositions of the invention is particularly pronounced. However, the weight ratios of individual components can be varied within relatively wide ranges. Generally speaking, there are 1:240 to 200:1 parts by weight, preferably 1:40 to 50:1 parts by weight, especially preferably 1:10 to 40:1 of component I per part by weight of component of group IIa/IIb.

The application rate of a safener of group III is customarily 5 to 2500 g of active ingredient per hectare, preferably 5 to 1000 g a.i./ha, especially preferably 10 to 400 g a.i./ha. At certain concentration ratios, the antagonistic effect (=safening) of the herbicide/safener compositions of the invention related to the crops is particularly pronounced. However, the weight ratios of individual components can be varied within relatively wide ranges. Generally speaking, there are 1:250 to 100:1 parts by weight, preferably 1:40 to 50:1 parts by weight, especially preferably 1:4 to 20:1 of component I per part by weight of the safener of group III.

Examples

Herbicidal Effect and Crop Plant Compatibility Post-Emergence

The experiments were conducted as post applied field trials with plot sizes of 11.25-15 qm, an application volume of 250-300 liter water per hectare and two to three repetitions. Seeds of different crops and various monocot and dicot weeds were either sown or the monocot and dicot weeds were grown naturally and established under common field conditions. The application rates of the herbicidal active ingredients when used alone or in combinations are given in the tables below. Applications were done at different growth stages (GS) as indicated in the tables below. The evaluation 13-46 days after application was assessed visually. Treated plants were compared to untreated plants (0-100% scale). The results (as a mean of 2 to 3 replicates) are reported in the tables below. In the tables below, GS (growth stage) corresponds to BBCH-code (see for reference Lancashire, P. D.; H. Bleiholder; P. Langeluddecke; R. Stauss; T van den Boom; E. Weber; A. Witzen-Berger (1991). "A uniform decimal code for growth stages of crops and weeds": *Ann. Appl. Biol.* 119 (3): 561-601; or Witzenberger, A.; H. Hack; T van den Boom (1989): "Erläuterungen zum BBCH-Dezimal-Code für die Entwicklungsstadien des Getreides—mit Abbildungen". Gesunde pflanzen 41: 384-388; or Zadoks, J. C., Chang, T T & Konzak, C. F. (1974): A decimal code for the growth stages of cereals. *Weed Research* 14, 415421)

The generated values from applications alone and in combination were used to evaluate the combinatorial effects according to S. R. Colby, Weeds 15, pages 20 to 22 (1967).

The abbreviations have the following meaning:

a.i.=active ingredient

E=Observed combination effect value

EC=Calculated combination effect value according to Colby (EC=A+B−A×B/100)

Diff.=Difference (%) between observed and expected combination effect value (%) (observed minus expected value)

Evaluation of Effects:

−E>EC: −>Synergism (+Diff.)

−E=EC: −>Additive effect

−E<EC: −>Antagonism (−Diff.)

The results are given in the following tables.

TABLE 1

| Post emergence application GS30, field trial | | |
|---|---|---|
| Compound | Dosage [g a.i./ha] | Efficacy/selectivity [%] against *Triticum aestivum* |
| COMPOUND I | 200 | 30 |
| COMPOUND I + mefenpyr-diethyl | 200 + 13.5 | 10 (Ec = 30, Diff. = −20) |

TABLE 2

| Post emergence application GS29, field trial | | |
|---|---|---|
| Compound | Dosage [g a.i./ha] | Efficacy/selectivity [%] against *Hordeum vulgare* |
| COMPOUND I | 200 | 32 |
| COMPOUND I + mefenpyr-diethyl | 200 + 13.5 | 12 (Ec = 32, Diff. = −20) |

TABLE 3

Post emergence application GS29, field trial

| Compound | Dosage [g a.i./ha] | Efficacy/selectivty [%] against *Triticum aestivum* |
|---|---|---|
| COMPOUND I | 200 | 18 |
| mesosulfuron-methyl + mefenpyr-diethyl | 7.5 + 22.5 | 0 |
| COMPOUND I + mesosulfuron-methyl + mefenpyr-diethyl | 200 + 7.5 + 22.5 | 9 (Ec = 18, Diff. = −9) |

TABLE 4

Post emergence application GS23, field trial

| Compound | Dosage [g a.i./ha] | Efficacy [%] against *Galium aparine* |
|---|---|---|
| COMPOUND I | 100 | 25 |
| mesosulfuron-methyl + mefenpyr-diethyl | 7.5 + 22.5 | 0 |
| COMPOUND I + mesosulfuron-methyl + mefenpyr-diethyl | 100 + 7.5 + 22.5 | 50 (Ec = 25, Diff. = + 25) |

TABLE 5

Post emergence application GS18, field trial

| Compound | Dosage [g a.i./ha] | Efficacy [%] against *Centaurea cyanus* |
|---|---|---|
| COMPOUND I | 50 | 25 |
| fluroxypyr | 150 | 30 |
| COMPOUND I + fluroxypyr | 50 + 150 | 70 (Ec = 48, Diff. = +22) |

TABLE 6

Post emergence application GS18, field trial

| Compound | Dosage [g a.i./ha] | Efficacy [%] against *Centaurea cyanus* |
|---|---|---|
| COMPOUND I | 50 | 25 |
| diflufenican | 75 | 0 |
| COMPOUND I + diflufenican | 50 + 75 | 78 (Ec = 25, Diff. = +53) |

TABLE 7

Post emergence application GS23, field trial

| Compound | Dosage [g a.i./ha] | Efficacy [%] against *Galium aparine* |
|---|---|---|
| COMPOUND I | 100 | 0 |
| bromoxynil AS octanoate | 175 | 10 |
| COMPOUND I + bromoxynil AS octanoate | 100 + 13.5 | 50 (Ec = 10, Diff. = +40) |

TABLE 8

Post emergence application GS18, field trial

| Compound | Dosage [g a.i./ha] | Efficacy [%] against *Papaver rhoeas* |
|---|---|---|
| COMPOUND I | 50 | 0 |
| metribuzin | 50 | 0 |
| COMPOUND I + metribuzin | 50 + 50 | 50 (Ec = 0, Diff. = +50) |

TABLE 9

Post emergence application GS18, field trial

| Compound | Dosage [g a.i./ha] | Efficacy [%] against *Centaurea cyanus* |
|---|---|---|
| COMPOUND I | 100 | 75 |
| aclonifen | 450 | 0 |
| COMPOUND I + aclonifen | 100 + 450 | 97 (Ec = 75, Diff. = +22) |

The invention claimed is:

1. A synergistic combination comprising 2-(2,4-dichlorophenyl)methyl-4,4-dimethyl-3-isoxazolidone (compound I) and one or more additional herbicidal active ingredients,
   wherein the one or more additional herbicidal active ingredients is either flufenacet or flufenacet and diflufenican.

2. The combination according to claim 1, wherein the one or more additional herbicidal active ingredients is flufenacet.

3. The combination according to claim 1, wherein the one or more additional herbicidal active ingredients are flufenacet and diflufenican.

4. The combination according to claim 1, wherein the weight ratio of the compound I to the one or more additional herbicidal active ingredients is in a range of from 1:40 to 50:1.

5. The combination according to claim 1, wherein the weight ratio of the compound I to the one or more additional herbicidal active ingredients is in a range of from 1:10 to 40:1.

6. A method for controlling one or more undesired plants in an agricultural crop comprising applying the combination according to claim 1 to one or more plants and/or an area in which the plants grow.

7. The method according to claim 6, wherein the combination is applied after emergence of the crop.

8. The method according to claim 7, wherein the agricultural crop is cereals, maize or rice.

9. The method according to claim 7, wherein the one or more undesired plants are monocotyledonous or dicotyledonous annual weeds, or difficult-to-control perennial weeds.

10. The method according to claim 7 wherein the application rate of the compound I is 50 to 200 g of active ingredient (a.i.) per hectare, and wherein the application rate of the one or more herbicides is 5 to 500 g of active ingredient per hectare.

11. A method for controlling one or more undesired plants in an agricultural crop comprising applying the combination according to claim 2 to one or more plants and/or an area in which the plants grow.

12. The method according to claim 11, wherein the combination is applied after emergence of the crop.

13. The method according to claim 12, wherein the agricultural crop is cereals, maize or rice.

14. The method according to claim 12, wherein the application rate of the compound I is 50 to 200 g of active ingredient (a.i.) per hectare, and wherein the application rate of the one or more herbicides is 5 to 500 g of active ingredient per hectare.

15. The method according to claim 12, wherein the one or more undesired plants are monocotyledonous or dicotyledonous annual weeds, or difficult-to-control perennial weeds.

16. The combination according to claim 1, wherein the 2-(2,4-dichlorophenyl)methyl-4,4-dimethyl-3-isoxazolidone (compound I) and the one or more additional herbicidal active ingredients are the only active compounds in the combination.

* * * * *